US008711987B2

(12) United States Patent
Sahlin et al.

(10) Patent No.: US 8,711,987 B2
(45) Date of Patent: Apr. 29, 2014

(54) METHOD AND RECEIVER FOR JOINTLY DECODING RECEIVED COMMUNICATION SIGNALS USING MAXIMUM LIKELIHOOD DETECTION

(75) Inventors: Henrik Sahlin, Molnlycke (SE); Ulf Lindgren, Vastra Frolunda (SE); Peter Naucler, Knivsta (SE); Chester Park, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 259 days.

(21) Appl. No.: 13/264,192

(22) PCT Filed: Apr. 16, 2009

(86) PCT No.: PCT/EP2009/054560
§ 371 (c)(1),
(2), (4) Date: Oct. 13, 2011

(87) PCT Pub. No.: WO2010/118779
PCT Pub. Date: Oct. 21, 2010

(65) Prior Publication Data
US 2012/0033683 A1    Feb. 9, 2012

(51) Int. Cl.
*H04L 27/06* (2006.01)
(52) U.S. Cl.
USPC .......... 375/341; 375/260; 375/262; 375/265; 375/267; 375/316
(58) Field of Classification Search
CPC . H04L 1/0054; H04L 25/0204; H04L 5/0023; H04L 27/2647; H04L 25/0331; H04L 25/03305; H04B 7/0854; H04B 7/0842; H04B 7/08; H04B 7/0848; H03M 13/6502; H03M 13/41
USPC .......... 375/341, 260, 262, 265, 267; 370/480
See application file for complete search history.

(56) References Cited

U.S. PATENT DOCUMENTS 5,852,630 A * 12/1998 Langberg et al. ............. 375/219

FOREIGN PATENT DOCUMENTS

WO    2008104643 A1    9/2008

OTHER PUBLICATIONS

Gerstacker, W., et al., "Trellis-Based Receivers for SC-FDMA Transmission Over MIMO ISI Channels", Communications, 2008, ICC '08, IEEE International Conference on, IEEE, Piscataway, NJ, USA, May 19, 2008, pp. 4526-4531, XP031266170.
Jiang, M., et al., "Design of Efficient Receivers for DFT-S-OFDMA Systems", Information Sciences and Systems, 2009, CISS 2009, 43rd Annual Conference on, IEEE, Piscataway, NJ, USA, Mar. 18, 2009, pp. 557-562, XP031468665.

* cited by examiner

*Primary Examiner* — Dhaval Patel
(74) *Attorney, Agent, or Firm* — Rothwell, Figg, Ernst & Manbeck, P.C.

(57) ABSTRACT

The present invention relates to a method in a receiver for decoding at least two received communication signals, wherein the communication signals are modulated, precoded by a discrete Fourier transform and transmitted by means of single-carrier frequency division multiple access scheme (SC-FDMA). The method comprises the steps of: performing an antenna combining and equalization on a signal observed at the receiver; performing inverse discrete Fourier transform on a model of the observed signal; whitening a time domain model of the observed signal; and jointly detecting the received at least two communication signals by performing soft value calculations based on maximum likelihood detection of a whitened time domain model using a whitened time domain channel estimate.

13 Claims, 4 Drawing Sheets

METHOD AND RECEIVER FOR JOINTLY DECODING RECEIVED COMMUNICATION SIGNALS USING MAXIMUM LIKELIHOOD DETECTION

CROSS-REFERENCE TO RELATED APPLICATION

This application is a 35 U.S.C. §371 National Phase Entry Application from PCT/EP2009/054560, filed Apr. 16, 2009, and designating the United States.

TECHNICAL FIELD OF THE INVENTION

The present invention relates generally to the field of wireless telecommunications and, in particular, to methods and means for decoding received communication signals.

BACKGROUND OF THE INVENTION

LTE (Long-term evolution) is a project within the 3GPP (3rd Generation Partnership Project) with an aim to improve the UMTS (Universal Mobile Telecommunications System) mobile phone standard for coping with future technology evolutions. The LTE comprises developing a new air interface standard, and the downlink (base station to user equipment) will be based on OFDMA (orthogonal frequency division multiple access). For the uplink (user equipment to base station), SC-FDMA (single carrier frequency division multiple access) is an attractive choice as SC-FDMA has a lower peak-to-average power ratio than OFDM. The lower peak-to-average power ratio entails improved transmitter power efficiency for the battery-operated user equipment, which is an important design consideration.

In any wireless communication system, a transmitted signal is distorted due to dynamic properties of a radio channel through which it is transmitted. In order to compensate for the dynamic properties of the radio channel, different methods are available for combating interference. An ideal compensation would completely cancel the effects of the radio channel and the resulting equalized channel would be completely frequency flat. However, such a scheme would in most cases lead to unwanted noise amplification limiting the performance. Equalization schemes must therefore provide a trade-off between noise amplification and making the equalized channel frequency-flat.

For the transmitted data to be recovered at the receiver it is important that the interference is suppressed. Besides the mentioned power consumption aspect of the user equipment, there is also a desire to restrict the size and costs of the user equipment in order for it to be attractive. The desire to reduce size, cost and power consumption is valid also for receivers in the base station. The space for and costs of processing circuitry should therefore be kept at a minimum. The complexity of the methods used for combating the interference competes with a desire to cancel the interference to as large extent as possible. The designer thus stands before the choice of using interference combating algorithms having less than optimal performance and designing a rather complex and consequently expensive receiver. In short, there is a trade-off between complexity of receiver and performance in terms of accuracy.

A particular example of this trade-off is the choice of decoding scheme to be used in the receiver. An advanced detection scheme is the maximum likelihood detection (MLD), but it has a computational complexity that is exponential with the number of modulation symbols. Efforts have been made to reduce the computational complexity to acceptable levels, an efficient implementation of MLD being, for example, sphere decoding.

In view of the above, it would be desirable to provide simplified and yet effective interference cancellation methods, and in particular a MLD having even further reduced complexity than the hitherto known methods.

SUMMARY OF THE INVENTION

It is a general object of the invention to provide a method and receiver for decoding received communication signals having a balanced trade-off between the complexity of the receiver and the performance.

It is a particular object of the present invention to provide an improved method and receiver for decoding a received communication signal, the method having reduced complexity and thus enabling the design of a receiver having reduced circuitry and thus cost.

It is another object of the present invention to provide a method and receiver for decoding a received communication signal wherein an equalized and frequency flat channel is provided, and wherein also spatially coloured noise is suppressed.

These objects, among others, are achieved by methods and receivers as claimed in the appended claims.

In accordance with the invention, a method in a receiver is provided for decoding at least two received communication signals. The communication signals are being modulated, pre-coded by a discrete Fourier transform and transmitted by means of single-carrier frequency division multiple access scheme (SC-FDMA). The method comprises a first step of performing an antenna combining and equalization on a signal $Y(m)$ observed at the receiver based on a weighting matrix $W(m)$. Thereby a model of observed signal $\hat{X}(m)$ and a frequency domain channel estimate $\hat{H}(m)$ are provided. The method further comprises a step of performing inverse discrete Fourier transform on the model of observed signal $\hat{X}(m)$, thereby providing a time domain model $\tilde{S}(n)$ of the observed signal $\hat{X}(m)$, and performing an inverse discrete Fourier transform of the frequency domain channel estimate $\hat{H}(m)$, thereby providing a time domain channel estimate $\tilde{G}(p)$ with length P wherein $p=0, 1, \ldots, P-1$. The method comprises the further step of whitening the time domain model $\tilde{S}(n)$ of the observed signal $\hat{X}(m)$, thereby providing a whitened time domain model $\hat{S}(n)$ of the time domain model $\tilde{S}(n)$ and a whitened time domain channel estimate $\hat{G}(p)$ for $p=0, 1, \ldots, P-1$. The method comprises a last step of jointly detecting the received at least two communication signals by performing soft value calculations based on maximum likelihood detection of the whitened time domain model $\hat{S}(n)$, using the whitened time domain channel estimate $\hat{G}(p)$ for $p=0, 1, \ldots, P-1$, whereby the received communication signals are decoded. By means of the invention, a reduced complexity of joint detection of communication signals is enabled at a receiver. The error probability is minimized for the case that the output of the equalization step is partially available, i.e. divided into several smaller parts and each part taken as input to the step of joint detection. The feature of whitening the signal, providing a spatially whitened signal, enables the suppression of interference that is spatially coloured.

In accordance with a variation of the invention, the step of whitening is performed before the step of joint detection. By performing the whitening separately before the joint detection, unlike in the prior art wherein such calculations are part of the joint detection, the total amount of calculations is greatly reduced.

In accordance with another variation of the invention, the step of jointly detecting comprises a single tap channel model, P=1. The inventive method is thus applicable to both single-tap channel models as well as multi-tap channel models, whereby a flexible method is provided easily adaptable to different applications. By means of the invention, flexibility is provided regarding the trade-off between complexity of receiver and performance thereof. The definition of the input to the joint detection step can be performed flexibly, for example applying the joint detection to a part of a SC-FDMA symbol or for two consecutive symbols. The more consecutive symbols that are included, the better the performance becomes, but at the cost of computational increase.

In accordance with yet another variation of the invention, the method comprises, prior to the step of jointly detecting, a step of performing QR factorization of the time domain channel matrix estimate $\hat{G}$, providing a QR factorized signal model $\hat{S}_{QR}(n)$ and a time domain channel matrix estimate after QR factorization $\hat{G}_{QR}$. The step of jointly detecting then comprises detecting the QR factorized signal model $\hat{S}_{QR}(n)$ by: calculating soft values for bit number i and user k providing two sets of all possible transmitted symbols $S_{1,k,i}$, $S_{0,k,i}$, for which transmitted bit is "1" and "0", respectively; selecting which of the two sets of all possible transmitted symbols $S_{1,k,i}$, $S_{0,k,i}$ to evaluate; and evaluating the selected possible transmitted symbols. By performing a QR-factorization, the amount of calculations is reduced even further, since the channel matrix $\hat{G}_{QR}$ is upper triangular. Thereby the use of M-algorithm is enabled.

In accordance with still another variation of the invention, using the M-algorithm, the step of evaluating comprises the steps of: defining maximum likelihood detection residuals as $E(n)=\hat{S}_{QR}(n)-\hat{G}_{QR}S(n)$, where $E(n)=[e_0(n) \ldots e_{K-2}(n) \; e_{K-1}(n)]^T$, $\hat{S}_{QR}(n)=[\hat{s}_{QR,0}(n) \ldots \hat{s}_{QR,K-2} \; \hat{s}_{QR,K-1}(n)]^T$ and $S(n)=[s_0(n) \ldots s_{K-2}(n) \; s_{K-1}(n)]^T$, whereby residual $e_{K-1}(n)$ only depends on observation symbol $\hat{s}_{QR,K-1}(n)$ and on symbol hypothesis $s_{K-1}(n)$,
  (i) calculating, for the last row of the definition, metric values equal to the absolute square of maximum likelihood detection residuals for all possible candidates of $s_{K-1}(n)$,
  (ii) determining M candidates of $s_{K-1}(n)$, providing M surviving candidates,
  (iii) repeating steps (i) and (ii) for one additional value of the observation signal $\hat{s}_{QR,K-2}(n)$,
  (iv) calculating, for the M surviving candidates, all possible transmitted candidates of $s_{K-2}(n)$, and
  (v) repeating steps (iii) and (iv) for all observation signals.
The use of the M-algorithm greatly reduces the amount of calculations required for determining, with high probability which codeword that was most likely to have been sent. The number of iterations can be held to a minimum.

In accordance with yet another variation of the invention, the step of jointly detecting comprises soft value calculations performed by means of Log Likelihood Ratio with squared Euclidian distances or Log Likelihood Ratio based on Euclidian distances. The method is flexible in that different methods can be utilized for the soft value calculations.

In accordance with yet another variation of the invention, the step of whitening comprises: estimating a residual noise-plus-interference covariance matrix $R_{n_k}$; performing Cholesky decomposition of the residual noise-plus-interference covariance matrix $R_{n_k}=LL^*$ thereby providing a lower triangular matrix L; whitening the signal time domain model $\tilde{S}(n)$ by multiplying the signal time domain model $\tilde{S}(n)$ with $L^*$, thereby providing a whitened time domain model $\hat{S}(n)$; and whitening the time domain channel matrix estimate $\tilde{G}$ by multiplying the time domain channel estimate $\tilde{G}$ with L, thereby providing a whitened time domain channel estimate $\hat{G}$. A method that is easily implemented in e.g. software is thereby provided.

In accordance with still another variation of the invention, the step of whitening comprises scaling the received signal, where only the diagonal elements of $R_{n_k}$ are used such that the scaling is done with $(\text{Diag}\{R_{n_k}\})^{-1/2}$. This embodiment reduces the number of calculations required even further, but at the expense of loosing some performance in terms of accuracy. Again, the method is flexible in that the balance between complexity of receiver and performance thereof can be adapted to suit the particular application at hand.

In accordance with yet another variation of the invention, the step of scaling comprises estimating a residual noise covariance matrix $\tilde{L}$ by a sum of $\Lambda_N$ and $\Lambda_{ISI}$, wherein $\Lambda_N$ is the noise covariance matrix of the white noise matrix $N_{\tilde{S}}(n)$ and $\Lambda_{ISI}$ is inter-symbol interference covariance matrix, and scaling the signal time domain model $\tilde{S}(n)$ by multiplying the signal time domain model $\tilde{S}(n)$ with $(\text{Diag}\{\tilde{L}\})^{-1/2}$, providing a scaled time domain model $\hat{S}(n)$, and scaling the time domain channel matrix estimate $\tilde{G}$ by multiplying the time domain channel matrix estimate $\tilde{G}$ with $(\text{Diag}\{\tilde{L}\})^{-1/2}$, providing a scaled time domain channel estimate $\hat{G}$. Again, a method that is easily implemented in software and/or hardware is thus provided.

In accordance with other variation of the invention, the antenna combining comprises performing a linear minimum mean square error, and/or the weighting matrix W(m) is chosen so as to minimize a mean square error. Well-known and reliable approaches for antenna combining can thus be used.

The invention is also related to a receiver comprising means for implementing the above method, whereby advantages corresponding to the above-mentioned are achieved.

Further features and advantages thereof will become clear upon reading the following detailed description and the accompanying drawings.

DETAILED DESCRIPTION OF EMBODIMENTS OF THE INVENTION

Only parts of a telecommunication system necessary for the understanding of the present invention are described. For clarity, descriptions of well-known devices are thus omitted.

Figure 1:
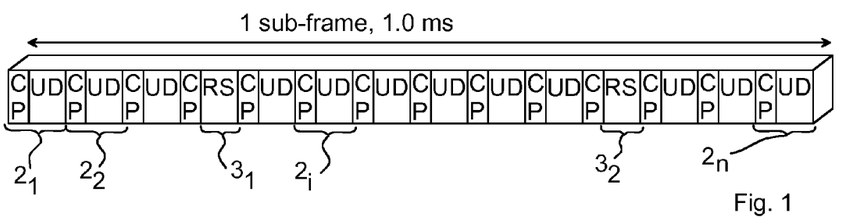
FIG. 1 illustrates one sub-frame for uplink LTE.

As mentioned in the introductory part, the uplink for LTE is based on SC-FDMA, sometimes also denoted DFTS- OFDM (Discrete Fourier Transform Spread-OFDM) since SC-FDMA can be regarded as a DFT spread OFDM. FIG. 1 illustrates one sub-frame 1 for uplink LTE. In the LTE uplink, several SC-FDMA symbols $2_1, \ldots, 2_i, \ldots, 2_n$ form the sub-frame 1. In particular, the sub-frame comprises 12 SC-FDMA symbols $2_1, \ldots, 2_i, \ldots, 2_n$ with user data (UD) and a respective cyclic prefix (CP), n in the illustrated case being equal to 12. The sub-frame 1 further comprises two symbols $3_1, 3_2$ with reference signals (RS), for enabling the establishment of channel parameters, the reference signals sometimes also denoted pilot signals or training signals. The present invention is mainly concerned with such SC-FDMA uplinks.

The present invention will be thoroughly described first with reference to a special case, after which the generalized inventive concept will be described.

Figure 2:
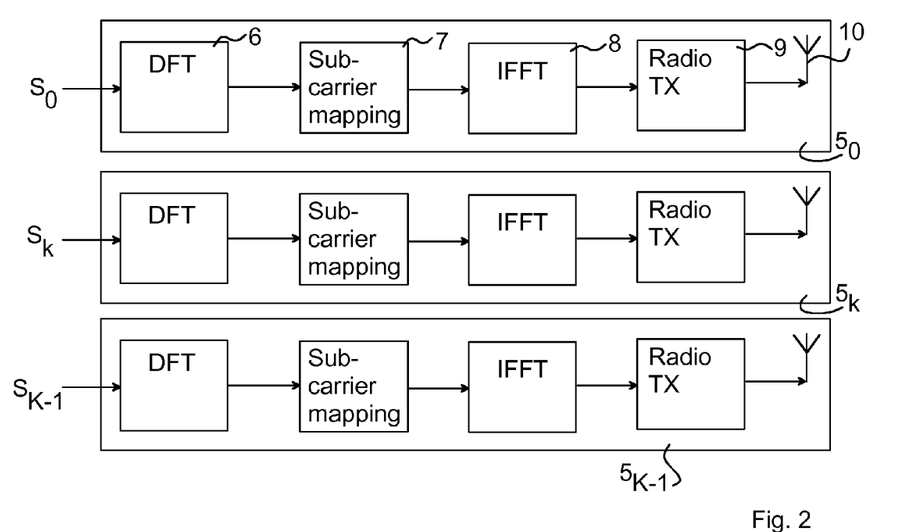
FIG. 2 illustrates transmitters for K user equipments, each having one antenna.

FIG. 2 illustrates a schematic overview of the different steps performed in a transmitter part $5_0, \ldots, 5_k, \ldots, 5_{K-1}$ of a user equipment in accordance with the invention. In particular, the transmitter part $5_0, \ldots, 5_k, \ldots, 5_{K-1}$ comprises means 6 for performing a discrete Fourier transform (DFT), means 7 for performing sub-carrier mapping, means 8 for performing inverse fast Fourier transform (IFFT), and means 9 for performing a radio transmission, described briefly in the following. Such means may comprise means conventionally used in signal processing, e.g. electronics implementing filters, and/or software etc.

In each SC-FDMA symbol, each user equipment transmits $N_c$ symbols, which are demodulated, for example by means of quadrature phase shift keying (QPSK) or quadrature amplitude modulation (QAM), e.g. 16 QAM or 64 QAM. The SC-FDMA symbol for user equipment k is denoted by $S_k(n)$ and can be expressed as:

$$S_k = [s_k(0) s_k(1) \ldots s_k(N_c-1)] \quad (1)$$

These symbols are fed to the DFT, forming transmitted symbols:

$$x_k(m) = \frac{1}{\sqrt{N_c}} \sum_{n=0}^{N_c-1} s_k(n) e^{-j\frac{2\pi nm}{N_c}} \quad (2)$$

for frequency index m, $0 \leq m \leq N_c-1$. Each user is allocated a frequency interval, in which it is scheduled for transmission. A scheduler placed in the base station decides this allocation. An allocation of the $N_c$ symbols $x_k(m)$ to $N_c$ sub-carriers in the scheduled frequency interval is done in the sub-carrier mapping. Finally, the signals are processed in the IFFT, fed to a radio signal processing and sent on the air interface by an antenna.

Although only one transmitter antenna 10 is illustrated for each transmitter part $5_0, \ldots, 5_k, \ldots, 5_{K-1}$, it is noted that the present invention can be extended to the case of several transmit antennas for each user equipment.

Figure 3:
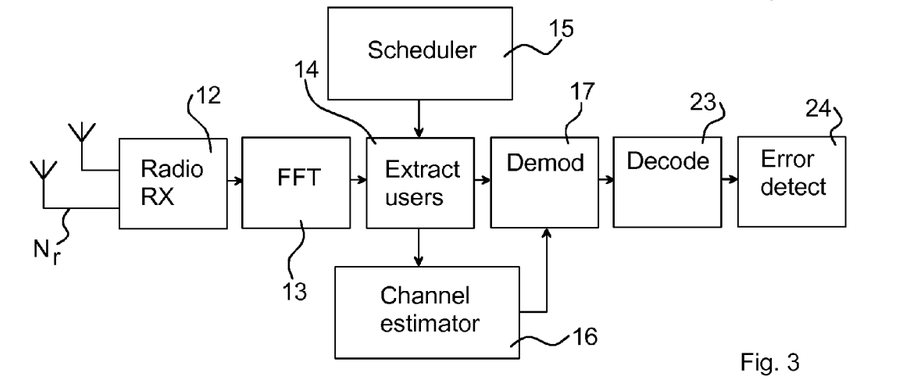
FIG. 3 illustrates the receiver structure for a receiver in accordance with the present invention.

FIG. 3 illustrates a receiver structure in accordance with the invention, the receiver 11 being placed e.g. in a base station. The signals are received by $N_r$ antennas, they are filtered in a radio receiver part 12, transformed to the frequency domain in an FFT means 13 and fed to a sub-carrier extraction means 14. The sub-carrier extraction means 14 uses the same sub-carriers as in the transmitter part $5_0, \ldots, 5_k, \ldots, 5_{K-1}$, as given by a scheduler 15.

In the present application, the sub-carrier mapping, IFFT, transmitter radio, transmitter antennas, air interface channel, receiver antennas, receiver radio FFT and sub-carrier mapping is modelled by a channel matrix H(m), performed by channel estimator means 16, for frequency index m such that the observation signals Y(m), i.e. signals as observed in the receiver 11, equals $$Y(m) = H(m)X(m) + N(m) \text{ or} \quad (3)$$

$$\underbrace{\begin{bmatrix} y_0 \\ y_1 \\ \vdots \\ y_{N_r-1} \end{bmatrix}}_{Y(m)} = \underbrace{\begin{bmatrix} h_{0,0}(m) & h_{0,1}(m) & \ldots & h_{0,K-1}(m) \\ h_{1,0}(m) & h_{1,1}(m) & & \\ \vdots & & \ddots & \\ h_{N_r-1,0}(m) & & & h_{N_r-1,K-1}(m) \end{bmatrix}}_{H(m)} \underbrace{\begin{bmatrix} x_0(m) \\ x_1(m) \\ \vdots \\ x_{K-1}(m) \end{bmatrix}}_{X(m)} + \underbrace{\begin{bmatrix} n_0(m) \\ n_1(m) \\ \vdots \\ n_{N_r-1}(m) \end{bmatrix}}_{N(m)}$$

In the above expression for observation signals, additive noise N(m) is added, modelled as Gaussian noise with covariance matrix $\Lambda$:

$$\Lambda = \begin{bmatrix} \lambda_{0,0} & \lambda_{0,1} & \ldots & \lambda_{0,N_r-1} \\ \lambda_{1,0} & \lambda_{1,1} & & \\ \vdots & & \ddots & \\ \lambda_{N_r-1,0} & & & \lambda_{N_r-1,N_r-1} \end{bmatrix} \quad (4)$$

The demodulator 17 of the receiver 11 illustrated in FIG. 3 is described in more detail with reference to FIG. 4.

Figure 4:
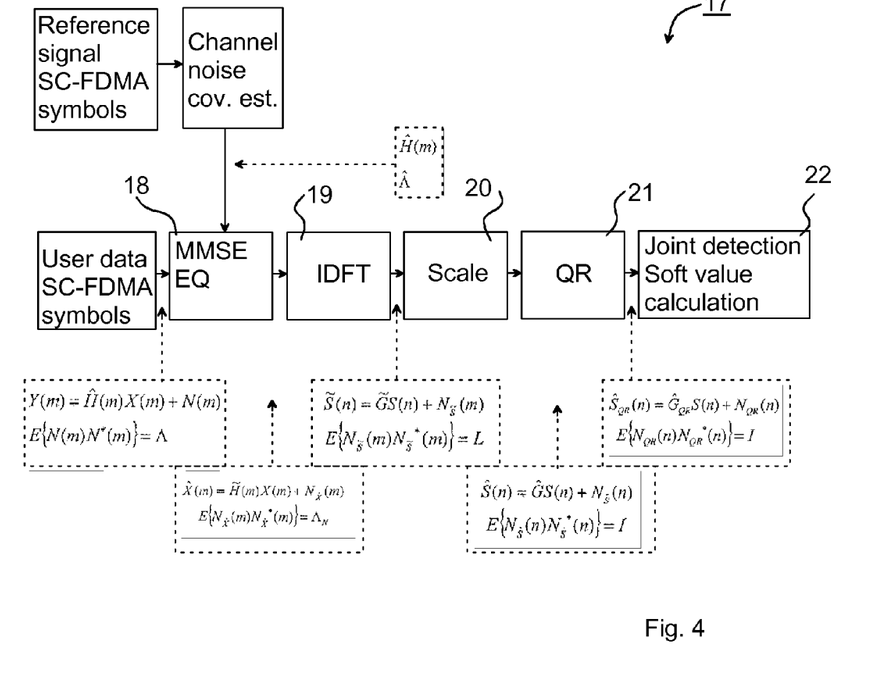
FIG. 4 illustrates an overview over channel estimator and demodulator.

FIG. 4 thus illustrates the demodulator 17, and in particular comprising means 18 for performing MMSE (minimum mean square error) equalization, means 19 for performing IDFT (inverse discrete Fourier transform), means 20 for performing scaling, means 21 for performing QR factorization and means 22 for performing joint detection with soft value calculations, all of which will be described in more detail in the following. Observed signals and residual noise models between the functional blocks are also indicated in the figure.

As illustrated in FIG. 4, a channel estimation algorithm provides both a channel estimate $$\hat{H}(m) = \begin{bmatrix} \hat{h}_{0,0}(m) & \hat{h}_{0,1}(m) & & \hat{h}_{0,K-1}(m) \\ \hat{h}_{1,0}(m) & \hat{h}_{1,1}(m) & & \\ \vdots & & \ddots & \\ \hat{h}_{N_r-1,0}(m) & & \ldots & \hat{h}_{N_r-1,K-1}(m) \end{bmatrix} \quad (5)$$

for frequency index $m=0, \ldots, N_c-1$ and a noise covariance matrix estimate $$\hat{\Lambda} = \begin{bmatrix} \hat{\lambda}_{0,0} & \hat{\lambda}_{0,1} & \ldots & \hat{\lambda}_{0,N_r-1} \\ \hat{\lambda}_{1,0} & \hat{\lambda}_{1,1} & & \\ \vdots & & \ddots & \\ \hat{\lambda}_{N_r-1,0} & & & \hat{\lambda}_{N_r-1,N_r-1} \end{bmatrix} \quad (6)$$

In FIG. 4, the demodulator 17 is thus described by MMSE equalization, IDFT, scaling, QR factorization and joint detection with soft value calculations.

MMSE Equalization

In the present application a linear MMSE antenna combination and equalization is used. It is however noted that other linear equalization schemes could be used, for example zero forcing. The observation signals Y(m) are multiplied with a frequency dependent weighting matrix W(m) such that $$\hat{X}(m) = W^*(m)Y(m) \qquad (7)$$

where ( )* denotes conjugate and transpose. $\hat{X}(m)$ is the MMSE combined observation signal, in the following denoted model of observed signal. The weighting matrix W(m) is selected such that the Mean Square Error (MSE)

$$C(m) = E\{(X(m) - \hat{X}(m))^*(X(m) - \hat{X}(m))\} \qquad (8)$$

is minimized, as is known within the art. The weighting matrix W(m) thus equals $$W(m) = \underbrace{(\hat{\Lambda} + \hat{H}(m)\hat{H}^*(m))^{-1}}_{\tilde{\Lambda}(m)} \hat{H}(m) \qquad (9)$$

wherein $\tilde{\Lambda}(m)$ is a noise and channel covariance matrix of size $N_r \times N_r$. This noise and channel covariance matrix needs to be inverted when calculating the MMSE weighting matrix W(m).

$$\tilde{\Lambda}(m) = \begin{bmatrix} \tilde{\lambda}_{0,0} & \tilde{\lambda}_{0,1} & \cdots & \tilde{\lambda}_{0,N_r-1} \\ \tilde{\lambda}_{1,0} & \tilde{\lambda}_{1,1} & & \\ \vdots & & \ddots & \\ \tilde{\lambda}_{N_r-1,0} & & & \tilde{\lambda}_{N_r-1,N_r-1} \end{bmatrix} = \qquad (10)$$

$$\begin{bmatrix} \hat{\lambda}_{0,0} & \hat{\lambda}_{0,1} & \cdots & \hat{\lambda}_{0,N_r-1} \\ \hat{\lambda}_{1,0} & \hat{\lambda}_{1,1} & & \\ \vdots & & \ddots & \\ \hat{\lambda}_{N_r-1,0} & & & \hat{\lambda}_{N_r-1,N_r-1} \end{bmatrix} +$$

$$\begin{bmatrix} \hat{h}_{0,0} & \hat{h}_{0,1} & \cdots & \hat{h}_{0,K-1} \\ \hat{h}_{1,0} & \hat{h}_{1,1} & & \\ \vdots & & \ddots & \\ \hat{h}_{N_r-1,0} & & & \hat{h}_{N_r-1,K-1} \end{bmatrix} \begin{bmatrix} h^*_{0,0} & h^*_{1,0} & \cdots & h^*_{N_r-1,0} \\ h^*_{0,1} & h^*_{1,1} & & \\ & & \ddots & \\ h^*_{0,K-1} & & & h^*_{N_r-1,K-1} \end{bmatrix}$$

where the frequency index m is omitted in the channel matrices. After this MMSE antenna combining and equalization, the model of the observed signal $\hat{X}(m)$ equals:

$$\hat{X}(m) = \tilde{H}(m)X(m) + N_{\hat{X}}(m) \qquad (11)$$

where $$\hat{X}(m) = \begin{bmatrix} \hat{x}_0(m) \\ \hat{x}_1(m) \\ \vdots \\ \hat{x}_{K-1}(m) \end{bmatrix} = \begin{bmatrix} \hat{h}^*_{0,1} & \hat{h}^*_{1,1} & \cdots & \hat{h}^*_{N_r-1,1} \\ \hat{h}^*_{0,2} & \hat{h}^*_{1,2} & & \\ \vdots & & \ddots & \\ \hat{h}^*_{0,K-1} & & & \hat{h}^*_{N_r-1,K-1} \end{bmatrix} \qquad (12)$$

$$\left( \begin{bmatrix} \tilde{\lambda}_{0,0} & \tilde{\lambda}_{0,1} & \cdots & \tilde{\lambda}_{0,N_r-1} \\ \tilde{\lambda}_{1,0} & \tilde{\lambda}_{1,1} & & \\ \vdots & & \ddots & \\ \tilde{\lambda}_{N_r-1,0} & & & \tilde{\lambda}_{N_r-1,N_r-1} \end{bmatrix} \right)^{-1} \begin{Bmatrix} y_0 \\ y_1 \\ \vdots \\ y_{N_r-1} \end{Bmatrix}$$

and $$\tilde{H}(m) = W^*(m)\hat{H}(m) = \qquad (13)$$

$$\hat{H}^*(m)\tilde{\Lambda}^{-1}(m)\hat{H}(m) = \begin{bmatrix} \tilde{h}_{0,0}(m) & \tilde{h}_{0,1}(m) & \cdots & \tilde{h}_{0,K-1}(m) \\ \tilde{h}_{1,0}(m) & \tilde{h}_{1,1}(m) & & \\ \vdots & & \ddots & \\ \tilde{h}_{K-1,0}(m) & & & \tilde{h}_{K-1,K-1}(m) \end{bmatrix}$$

Which is a channel estimate after this MMSE antenna combining and equalization. It is noted that the number of observation signals after the MMSE antenna combining and equalization equals the number K of transmitters $5_1, \ldots, 5_i, \ldots, 5_K$.

IDFT—Inverse Discrete Fourier Transform

Since the modulated symbols transmitted on the uplink are pre-coded by a DFT means 6, as was described with reference to FIG. 2, the symbols after MMSE combining and equalization must be transformed to the time domain. Next step of the demodulator is thus the IDFT:

$$\tilde{s}_k(n) = \frac{1}{\sqrt{N_c}} \sum_{m=0}^{N_c-1} \hat{x}(m) e^{j\frac{2\pi nm}{N_c}} \qquad (14)$$

for each user, $0 \le k \le K-1$ and symbol $0 \le n \le N_c - 1$. In a detection and soft value calculation, which will be described next, only the channel at lag zero can be considered. This time domain channel estimate is calculated as $$\tilde{G} = \frac{1}{N_c} \sum_{m=0}^{N_c-1} \tilde{H}(m) = \begin{bmatrix} \tilde{g}_{0,0} & \tilde{g}_{0,1} & \cdots & \tilde{g}_{0,K-1} \\ \tilde{g}_{1,0} & \tilde{g}_{1,1} & & \\ \vdots & & \ddots & \\ \tilde{g}_{K-1,0} & & & \tilde{g}_{K-1,K-1} \end{bmatrix} = \qquad (15)$$

$$\frac{1}{N_c} \sum_{m=0}^{N_c-1} \begin{bmatrix} \tilde{h}_{0,0}(m) & \tilde{h}_{0,1}(m) & \cdots & \tilde{h}_{0,K-1}(m) \\ \tilde{h}_{1,0}(m) & \tilde{h}_{1,1}(m) & & \\ \vdots & & \ddots & \\ \tilde{h}_{K-1,0}(m) & & & \tilde{h}_{K-1,K-1}(m) \end{bmatrix}$$

which is a single K×K matrix. After this IDFT, a time domain model of the observation signal can be written as $$\tilde{S}(n) = \tilde{G}S(n) + N_{\tilde{S}}(n) \qquad (16)$$

Scaling

Before detection and soft value calculation, which will be described later, a scaling of the observed signals can be done such that the residual noise variance is unity in each of the observation signals. By means of this scaling of the observed signals, divisions are avoided in the large amount of soft value calculations.

The residual noise contains two components: additive noise N(m) filtered through the above-described MMSE combining weights, and inter-symbol interference (ISI). An estimate of the filtered noise covariance matrix equals $$\Lambda_N = \sum_{m=0}^{N_c} W^*(m)\hat{\Lambda}W(m) \quad (17)$$

where W(m) are the MMSE combining matrices. The inter-symbol interference covariance matrix equals $$\Lambda_{ISI} = \sum_{m=0}^{N_c} (\tilde{H}(m) - \tilde{G})(\tilde{H}(m) - \tilde{G})^* \quad (18)$$

where subtraction of $\tilde{G}$ corresponds to a single tap time domain channel as calculated and shown under the previous subheading "IDFT—inverse discrete Fourier transform".

In total, the residual noise covariance equals $$\tilde{L} = \Lambda_N + \Lambda_{ISI} = \begin{bmatrix} \sigma_{00}^2 & \sigma_{01}^2 & \cdots & \sigma_{0K}^2 \\ \sigma_{10}^2 & \sigma_{11}^2 & & \\ \vdots & & \ddots & \\ \sigma_{K0}^2 & & & \sigma_{KK}^2 \end{bmatrix} \quad (19)$$

Observation signals and channel estimates can now be scaled as $$\hat{S}(n) = (\text{Diag}\{\tilde{L}\})^{-1/2} \tilde{S}(n) \quad (20)$$

$$= \begin{bmatrix} 1/\sigma_{0,0} & 0 & \cdots & 0 \\ 0 & 1/\sigma_{1,1} & & \\ \vdots & & \ddots & \\ 0 & \cdots & & 1/\sigma_{K-1,K-1} \end{bmatrix} \begin{bmatrix} \tilde{s}_0(n) \\ \tilde{s}_1(n) \\ \vdots \\ \tilde{s}_{K-1}(n) \end{bmatrix}$$

and $$\hat{G} = (\text{Diag}\{\tilde{L}\})^{-1/2} \tilde{G} \quad (21)$$

$$= \begin{bmatrix} \hat{g}_{0,0} & \hat{g}_{0,1} & \cdots & \hat{g}_{0,K-1} \\ \hat{g}_{1,0} & \hat{g}_{1,1} & & \\ \vdots & & \ddots & \\ \hat{g}_{K-1,0} & & & \hat{g}_{K-1,K-1} \end{bmatrix}$$

$$= \begin{bmatrix} 1/\sigma_{0,0} & 0 & \cdots & 0 \\ 0 & 1/\sigma_{1,1} & & \\ \vdots & & \ddots & \\ 0 & \cdots & & 1/\sigma_{K-1,K-1} \end{bmatrix}$$

$$\begin{bmatrix} \tilde{g}_{0,0} & \tilde{g}_{0,1} & \cdots & \tilde{g}_{0,K-1} \\ \tilde{g}_{1,0} & \tilde{g}_{1,1} & & \\ \vdots & & \ddots & \\ \tilde{g}_{K-1,0} & & & \tilde{g}_{K-1,K-1} \end{bmatrix}$$

respectively, such that the resulting time domain model of the signal equals $$\hat{S}(n) = \hat{G}S(n) + N_{\hat{S}}(n) \quad (22)$$

where $N_{\hat{S}}(n)$ is a spatially uncorrelated and white noise, with covariance matrix equal to identity matrix.

QR Factorization

In the Maximum Likelihood Detector (MLD) to be described under the next subheading, the computational complexity will be shown to increase exponentially with both the number of bits per symbol and the number of users. In order to reduce this computational complexity, a QR factorization of the time domain channel may be calculated such that the M-algorithm as described later on (under the subheading "M-algorithm") can be used. This QR factorization is calculated from the time domain channel estimate $\hat{G}$ as $$\hat{G} = Q \cdot R \quad (23)$$

such that Q is unitary matrix, i.e. $QQ^* = Q^*Q = I$, and R is upper triangular. By multiplying the observed signal $\hat{S}(n)$ with $Q^*$, the channel is transformed to be upper triangular, $$\hat{S}_{QR}(n) = Q^*\hat{S}(n) = Q^*\hat{G}S(n) + Q^*N_{\hat{S}} = \hat{G}_{QR}S(n) + N_{QR}(n) \quad (24)$$

where $\hat{G}_{QR} = R$ is introduced. This transformation does not change the negative Log Likelihood $$\|\hat{S}(n) - \hat{G}S(n)\|^2 = (\hat{S}(n) - \hat{G}S(n))^*QQ^*(\hat{S}(n) - \hat{G}S(n)) = \|\hat{S}_{QR}(n) - \hat{G}_{QR}S(n)\|^2 \quad (25)$$

as is used in the joint detection and soft value calculations to be described next.

Joint Detection and Soft Value Calculation

Soft value calculations, i.e. some probability calculations regarding the probability that the observed bit is actually equal to the transmitted bit now have to be performed. The algorithms for calculating the soft values to be used in the decoder will be described in the following.

First, a Maximum Likelihood Detector (MLD) is described for which in a joint detection context, a criterion is evaluated with hypotheses test candidates of all possible transmitted symbols for all users. Thereafter, an M-algorithm is described, for which a selection is done of which transmitted symbols to evaluate.

Maximum Likelihood Detector

The M-algorithm requires the channel matrix to be upper triangular, which is the result from the QR factorization described above.

However, it is noted that the MLD to be described could be used without the QR algorithms in which case $\hat{G}_{QR}$ can be replaced by $\hat{G}$ and $\hat{S}_{QR}(n)$ with $\hat{S}(n)$. All symbols of all users then have to be evaluated for all combinations. It is further noted that if no QR factorization is performed then the M-algorithm cannot be used.

For the maximum likelihood detector to be described below, and in the context of joint detection, a criterion is evaluated with hypothesis test candidates of all possible transmitted symbols for all users.

The soft value, for bit number i and user k is calculated, for example, as the Log Likelihood Ratio (LLR) with squared Euclidian distances $$L(b_k(i) | \hat{S}_{QR}) = \min_{S \in S_{0,k,i}} \{\|\hat{S}_{QR} - \hat{G}_{QR}S\|^2\} - \min_{S \in S_{1,k,i}} \{\|\hat{S}_{QR} - \hat{G}_{QR}S\|^2\} \quad (26)$$

where $b_k(i)$ is bit number I for user number k, and $S_{0,i,k}$ is the set of all possible transmitted symbols for which bit number i is "0" for user k. Correspondingly, $S_{1,i,k}$ is the set of all possible transmitted symbols for which bit number i is "1" for user k. This negative log likelihood $\|\hat{S}_{QR}-\hat{G}_{QR}S\|^2$ is often referred to as the MLD metric and $\hat{S}_{QR}-\hat{G}_{QR}S$ as MLD residuals.

As another example, LLR with Euclidian distances could be used for calculating the soft value $$L(b_k(i)|\hat{S}_{QR}) = \min_{S \in S_{0,k,i}}\{\|\hat{S}_{QR}-\hat{G}_{QR}S\|\} - \min_{S \in S_{1,k,i}}\{\|\hat{S}_{QR}-\hat{G}_{QR}S\|\} \quad (27)$$

In a system with K users and P bits per symbol, and for different modulation algorithms (illustrated in FIGS. 5a-5c)
BPSK (binary phase shift keying): P=1
QPSK (quadrature phase shift keying, FIG. 5a): P=2
16-QAM (16-quadrature amplitude modulation, FIG. 5b): P=4
64-QAM (FIG. 5c): P=6
the number of candidates, in the LLR is $$N_{states} = (2^P)^K \quad (28)$$

For example, with two user equipments, i.e. K=2, and QPSK, the number of candidates is 16 and the total set of all possible transmitted symbols is $$S_{total} = \frac{1}{\sqrt{2}} \quad (29)$$

$$\left\{ \begin{bmatrix} 1+j \\ 1+j \end{bmatrix} \begin{bmatrix} 1+j \\ 1-j \end{bmatrix} \begin{bmatrix} 1+j \\ -1+j \end{bmatrix} \begin{bmatrix} 1+j \\ -1-j \end{bmatrix} \begin{bmatrix} 1-j \\ 1+j \end{bmatrix} \begin{bmatrix} 1-j \\ 1-j \end{bmatrix} \begin{bmatrix} 1-j \\ -1+j \end{bmatrix} \begin{bmatrix} 1-j \\ -1-j \end{bmatrix} \right.$$

$$\begin{bmatrix} -1+j \\ 1+j \end{bmatrix} \begin{bmatrix} -1+j \\ 1-j \end{bmatrix} \begin{bmatrix} -1+j \\ -1+j \end{bmatrix} \begin{bmatrix} -1+j \\ -1-j \end{bmatrix} \begin{bmatrix} -1-j \\ 1+j \end{bmatrix}$$

$$\left. \begin{bmatrix} -1-j \\ 1-j \end{bmatrix} \begin{bmatrix} -1-j \\ -1+j \end{bmatrix} \begin{bmatrix} -1-j \\ -1-j \end{bmatrix} \right\}$$

with corresponding bits $$B_{total} = \frac{1}{\sqrt{2}} \quad (30)$$

$$\left\{ \begin{bmatrix} 0,0 \\ 0,0 \end{bmatrix} \begin{bmatrix} 0,0 \\ 0,1 \end{bmatrix} \begin{bmatrix} 0,0 \\ 1,0 \end{bmatrix} \begin{bmatrix} 0,0 \\ 1,1 \end{bmatrix} \begin{bmatrix} 0,1 \\ 0,0 \end{bmatrix} \begin{bmatrix} 0,1 \\ 0,1 \end{bmatrix} \begin{bmatrix} 0,1 \\ 1,0 \end{bmatrix} \begin{bmatrix} 0,1 \\ 1,1 \end{bmatrix} \begin{bmatrix} 1,0 \\ 0,0 \end{bmatrix} \begin{bmatrix} 1,0 \\ 0,1 \end{bmatrix} \right.$$

$$\left. \begin{bmatrix} 1,0 \\ 1,0 \end{bmatrix} \begin{bmatrix} 1,0 \\ 1,1 \end{bmatrix} \begin{bmatrix} 1,1 \\ 0,0 \end{bmatrix} \begin{bmatrix} 1,1 \\ 0,1 \end{bmatrix} \begin{bmatrix} 1,1 \\ 1,0 \end{bmatrix} \begin{bmatrix} 1,1 \\ 1,1 \end{bmatrix} \right\}$$

Figure 5A:
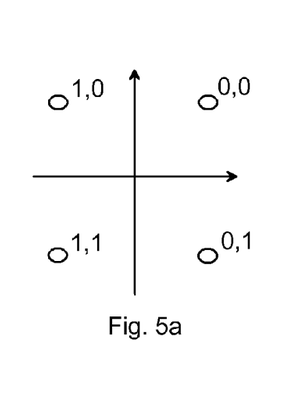
FIGS. 5a-5c illustrates mapping between symbols and bits.
Figure 5B:
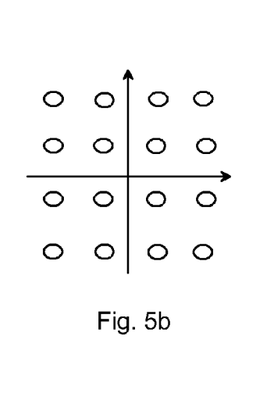
Figure 5C:
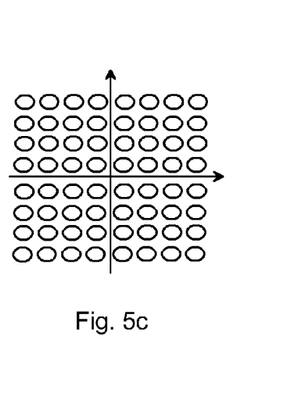

As an example, the set $S_{1,0,0}$ (for which the bit is equal to "1", for user zero and bit number zero) is the set containing element number 8, 9, 10, 11, 12, 13, 14 and 15 in $S_{total}$. FIGS. 5a-5c thus illustrates the mapping between symbols and bits, for QPSK, 16 QAM and 64 QAM symbol constellations, respectively.

M-Algorithm

Figure 6:
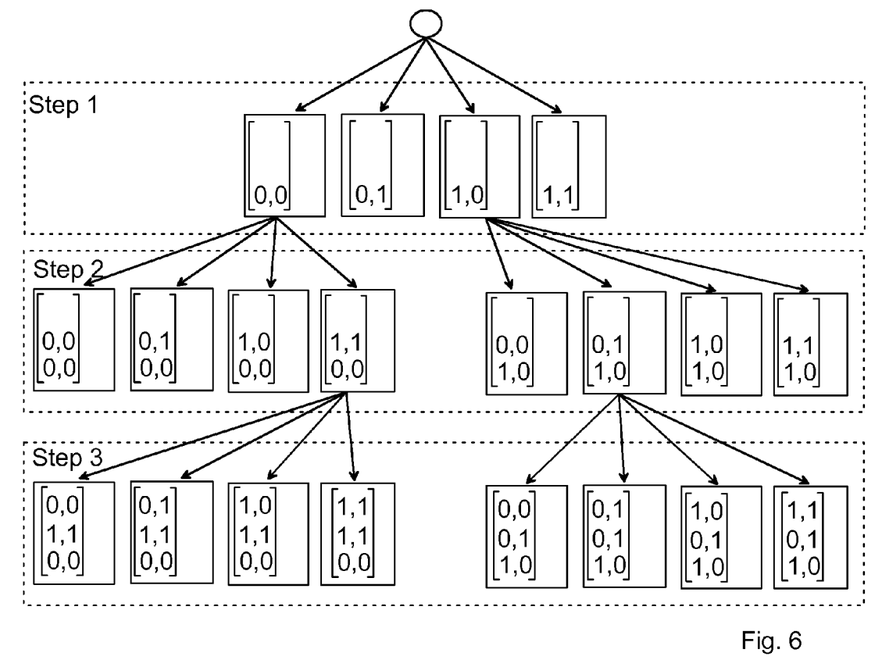
FIG. 6 illustrates an example of QRM-MLD.

If the QR-algorithm as described earlier is used, the channel matrix $\hat{G}_{QR}$ is upper triangular, as mentioned earlier. Then the MLD residuals used in the Log Likelihood Ratio (LLR) metrics equals $$E(n) = \hat{S}_{QR}(n) - \hat{G}_{QR}S(n) \quad (31)$$

$$= \begin{bmatrix} \hat{s}_{QR,0}(n) \\ \hat{s}_{QR,1}(n) \\ \vdots \\ \hat{s}_{QR,K-2}(n) \\ \hat{s}_{QR,K-1}(n) \end{bmatrix} - \begin{bmatrix} \hat{g}_{QR,0,0} & \hat{g}_{QR,0,1} & \cdots & & \hat{g}_{QR,0,K-1} \\ 0 & \hat{g}_{QR,1,1} & & & \vdots \\ \vdots & & \ddots & \hat{g}_{QR,K-2,K-2} & \hat{g}_{QR,K-2,K-1} \\ 0 & 0 & \cdots & 0 & \hat{g}_{QR,K-1,K-1} \end{bmatrix} \begin{bmatrix} s_0(n) \\ s_1(n) \\ \vdots \\ s_{K-2}(n) \\ s_{K-1}(n) \end{bmatrix}$$

such that the observation $\hat{s}_{QR,K-1}(n)$ depends only on $s_{K-1}(n)$. In a first step of an M-algorithm, metric values equal to the absolute square of the MLD residual are calculated for the last row only. Here, metric values are calculated for all possible candidates of $s_{K-1}(n)$. This is illustrated in FIG. 6, in step 1. Further, the M candidates of $s_{K-1}(n)$ are determined which yields the lowest metric. These symbols are defined as surviving candidates. In the next step, step 2, one additional value of the observation signal $\hat{s}_{QR,K-2}(n)$ is used and the residuals are calculated for all possible transmitted candidates of $s_{K-2}(n)$ but only with the M surviving candidates from the previous step. This procedure is then repeated, step 3, until all observation signals are included, where only M symbols as surviving candidates after each step. FIG. 6 thus illustrates an example of the QRM-MLD algorithm for M=2, QPSK (P=2) and three users (K=3).

The above-described steps provide a filtered signal from the received communication signal. This filtered signal is input to the final step of the demodulator 17, comprising demodulation means for demodulating or decoding the filtered signal in order to recover the transmitted data bits.

When LLR soft values are calculated, it is likely that no surviving candidate exists for some bit values. In the example illustrated in FIG. 6, bit number one equal to "1" for user K−1, has no surviving candidate in the final third step. Different possible algorithms for calculating soft values in this case can be used. For example, these missing metric values could be replaced by a large constant, which indicates that this bit is unlikely to have been transmitted. Alternatively, the LLR for bits, which are missing in the final step, is replaced by the metric difference from the latest previous step in which MLD metric values exist. In the example illustrated in FIG. 6, metric values for bit number one equal to "1" for user K−1 is only calculated in the first step. The LLR is in this case calculated by only considering the observation $s_{K-1}(n)$. Yet further algorithms for calculating soft values for bits lacking surviving candidates are conceivable.

Simulation Results

Simulations have been performed on the performance of uplink LTE, in terms of BLER (block error rate), using the MMSE equalizer as described above.

When comparing single detection and joint detection, the simulation results showed that with a single user equipment, there was no significant difference. The results further indicated that the performance increased for joint detection compared to single detection as the number of concurrent user equipments increases.

Simulations have also been done for LLR soft value calculations based on both Euclidian and squared Euclidian distances, using varying number of survivor candidates M. The results indicate no difference between the two LLR variants for MLD and QRM with M=16. When the number of survivor candidates is decreased to M=8, then the QRM performance degrade compared to MLD. In this case the Euclidian distance in the LLR showed better performance compared to squared Euclidian distance.

The present invention can be generalized, which will be described in the following. The above embodiment of the present invention can be considered a special case of the generalized idea of the invention, and more particularly, the scaling step can be replaced with a whitening step. This is realized by noticing that scaling is a special case of whitening, wherein only the elements of the main diagonal from a whitening matrix are used.

Thus, while the scaling described above uses only the diagonal elements of the whitening matrix, this embodiment comprises the use of the entire whitening matrix.

In short, the invention when generalized provides a reduced-complexity ML detection for SC-FDMA systems, the detection comprising the steps of equalization, whitening filtering and ML detection. In accordance with the invention, the output of the equalization step is divided into several smaller parts, each of which is taken as the input to the ML detection step. Stated differently, ML detection is performed not over the entire SC-FDMA symbol, but only over a part of the SC-FDMA symbol. Recall that a SC-FDMA symbol comprises multiple layers in the space domain and multiple time instants in the time domain. Therefore, a variety of ways of defining the input to ML detection (at the output of the equalization step) is made possible.

In the following, each layer at a time instant (at the output of the equalization step) is represented by each element of a vector symbol. As the simplest example, all (or some) of the layers at a time instant can be taken as the input to ML detection. In other words, the ML detection is carried out over each vector symbol (or some elements of a vector symbol) from the equalization (ML detection in space domain).

In addition all (or some) of the time instants within a SC-FDMA symbol at a layer can be taken as the input to ML detection and, in this case, the elements at the same location of all (or some) vector symbols are jointly detected (ML detection in time domain).

It is noted that the ML detection may be performed in a hybrid fashion, e.g. in both space and time domains. For example, the ML detection can be applied to the first two layers at two consecutive time instants and the second two layers at the same instants separately. Since the noise-plus-interference at the input of the ML detection is generally correlated, the whitening step should be placed in between the step of equalization and the step of ML detection. The whitening step (whitening filter) plays the role of de-correlating the noise-plus-interference and the coefficient is determined by the definition of the input to the ML detection.

In the following, MIMO SC-FDMA is assumed. As mentioned above, various ways of defining the input of the ML detection are possible, but in the following focus is concentrated on the case where all the layers, or more accurately, all the corresponding modulation symbols, at a time instant at the output of the equalization (represented by a vector symbol) are taken as the input to the step of ML detection. It is noted that most of the following description is applicable to any other definitions of the input to the step of ML detection. For example, the description is applicable to the case where all (or some) of the modulation symbols at a layer are taken as the input to the step of ML detection.

Assume that there are $N_t$ transmit antennas and $N_r$ receive antennas, and that each SC-FDMA symbol comprises R layers and K subcarriers. Further, assume that the step of equalization comprises linear equalization (LE). The output of the LE corresponding to a SC-FDMA symbol is expressed as $$\tilde{s} = (F_K^* \otimes I_R)\left(E^* R_w^{-1} E + \frac{1}{\alpha K} I_{RK}\right)^{-1} E^* R_w^{-1} E(F_K \otimes I_R)s + \frac{1}{\sqrt{\alpha K}}(F_K^* \otimes I_R)\left(E^* R_w^{-1} E + \frac{1}{\sqrt{\alpha K}} I_{RK}\right)^{-1} E^* R_w^{-1} w \quad (32)$$

where
$F_K$ is an K×K matrix representing the normalized DFT, and $F^*_K$ is the conjugate transpose thereof,
E is an $N_r$K×RK matrix representing the equivalent channel (including the precoder) and E* is the conjugate transpose thereof,
s is an RK×1 vector representing the transmitted symbols where $s=(s_0^T \ldots s_{K-1}^T)^T$ and $s_k$ is an R×1 column vector,
w is an $N_r$K×1 vector representing the noise symbols,
$R_w = E\{ww^*\}$ is an $N_r$K×$N_r$K matrix representing the noise covariance and ⊗ denotes the Kronecker product.

It is noted that $F_K \otimes I_R$, $F^*_K \otimes I_R$ and $$\left(E^* R_w^{-1} E + \frac{1}{\alpha K} I_{RK}\right)^{-1} E^* R_w^{-1}$$

in equation (B) represent per-layer DFT, per layer IDFT and per-subcarrier LE (MMSE) within a SC-FDMA symbol, respectively. It is further noted that the transmit power is normalized through α, which is defined as $$\alpha = \frac{N}{K} \frac{E_s}{N_t} \quad (33)$$

where
N is the total number of subcarriers
$E_s$ is the received energy per subcarrier The noise is assumed to be spatially correlated between the antenna branches, but temporally uncorrelated, and the correlation is time-invariant. Therefore, letting $w_k$ denote the R×1 vector symbol representing the noise symbols for the k-th subcarrier, the covariance matrix $R_{w_K} = E\{w_k w^*_k\}$ is related to $R_w$ as $$R_w = \text{diag}(R_{w_0}, R_{w_1}, \ldots, R_{w_{K-1}}) \quad (34)$$

It is noted that since each subcarrier experiences frequency-flat fading due to the orthogonality, the equivalent channel matrix E is a block-diagonal matrix expressed as $$E = \text{diag}(E_0, E_1, \ldots, E_{K-1}) \quad (35)$$

where an $N_r$×R matrix $E_k$ represents the equivalent channel (including the precoder) at the k-th subcarrier. Using the following definitions $$P = \left(E^* R_w^{-1} E + \frac{1}{\alpha K} I_{RK}\right)^{-1} E^* R_w^{-1} E = \text{diag}(P_0, P_1, \ldots, P_{K-1}) \quad (36)$$

$$Q = \left(E^* R_w^{-1} E + \frac{1}{\alpha K} I_{RK}\right)^{-1} E^* R_w^{-1} E = \text{diag}(Q_0, Q_1, \ldots, Q_{K-1}) \quad (37)$$

the k-th vector symbol at the output of the linear equalization step may be expressed as $$\tilde{s}_k = \left(\frac{1}{K}\sum_{k'=0}^{K-1} P_{k'}\right) s_k + \eta_k \quad (38)$$

where the covariance of noise-plus-interference $R_{\eta_k} = E\{\eta_k \eta^*_k\}$ is given by $$R_{\eta_k} = \frac{1}{\alpha K^2}\sum_{k'=0}^{K-1}\left(\alpha K P_{k'} P^*_{k'} + Q_{k'} R_{w_{k'}} Q^*_{k'}\right) - \frac{1}{K^2}\left(\sum_{k'=0}^{K-1} P_{k'}\right)\left(\sum_{k'=0}^{K-1} P_{k'}\right)^* \quad (39)$$

In the output from the linear equalization step, the gain of the desired signal is denoted by $$G = \frac{1}{K}\sum_{k'=0}^{K-1} P_{k'} \quad (40)$$

which is the resulting channel after linear equalization. This is a single tap channel model, i.e. instead of having an impulse response in the time domain, only the impulse response for time lag zero is used.

If $R_{\eta_k}$ is expressed as (e.g. using Cholesky decomposition)

$$R_{\eta_k}^{-1} = LL^* \quad (41)$$

then the coefficients of the whitening filter are given by $L^*$, and the output of the whitening filter, i.e. the input to the ML detection step, can be expressed as $$x_k = L^*\tilde{s}_k = L^*\left(\frac{1}{K}\sum_{k'=0}^{K-1} P_{k'}\right) s_k + L^*\eta_k \quad (42)$$

It is noted that the resulting noise-plus-interference $e_k = L^*\eta_k$ is completely whitened, since $$R_{e_k} = E\{e_k e^*_k\} = L^* E\{\eta_k \eta^*_k\} L = L^* R_{\eta_k} L = I_R \quad (43)$$

The complexity can be further reduced by approximating the whitening filter by a diagonal matrix whose diagonal entries are taken from those of $L^*$, which would result in the scaling-case described initially.

It is noted that the ML detection takes $$L^*\left(\frac{1}{K}\sum_{k'=0}^{K-1} P_{k'}\right)$$

as its channel matrix. For example, QRM-MLD (described earlier for the scaling case) starts with the QR decomposition given by $$L^*\left(\frac{1}{K}\sum_{k'=0}^{K-1} P_{k'}\right) = QR \quad (44)$$

where Q is a unitary matrix (i.e. $Q^*Q = QQ^* = I$ = "identity matrix") and R is upper triangular. This decomposition is calculated such that the channel L*G after linear equalization and whitening can be written as a product of Q and R. In a QRM-MLD approach, a signal is multiplied with Q*, such that the resulting channel equals R. In the present invention, the output of the linear equalization and the whitening filter $x_k$ is multiplied with Q*, such that the gain of the desired signal now equals R.

As mentioned earlier, ML detection over the entire SC-FDMA symbol always minimizes the error probability. The method in accordance with the invention thus shows some performance loss as the ML detection takes only a part of the output of the LE step as the input. However, given this limitation of parts given to the detection, the method in accordance with the invention provides the minimum error probability, since it whitens the noise-plus-interference at the input of ML detection. Subsequently, according to the ML detection rule under the assumption of additive Gaussian noise, minimizes the absolute square value of the residual, i.e. difference, between received signal and hypothesis testing of all possible transmitted symbols. It is noted that by means of the whitening step, i.e. by passing through the whitening filter, it is possible to directly apply the conventional ML detection that assumes uncoloured (white) noise-plus-interference at the input.

As described above, the invention utilizes a conventional linear equalization to decompose the modulation symbols within a SC-FDMA symbol and performs ML detection over a part of the modulation symbols, instead of performing ML detection over the entire SC-FDMA symbol. The whitening filtering between the linear equalization and the ML detection plays a role of removing the correlation of noise-plus-interference signal induced by the equalization.

Briefly comparing the first embodiment of the invention and the generalized concept, the equation (19) corresponds to equation (39), and equation (20) corresponds to equation (42). The results from these equations are then used in a corresponding manner, i.e. the signal and the channel are both multiplied with the result $(\text{Diag}\{\tilde{L}\})^{-1/2}$ and $L^*$, respectively.

The invention thus provides a reduced-complexity ML detection for SC-FDMA: equalization is followed by ML detection. The equalization could for example be linear equalization (LE) or decision feedback equalization (DFE), but other equalization methods are also conceivable. The output of the equalization step corresponding to a SC-FDMA symbol is divided into several parts, each of which is taken as the input of the ML detection. For example, in the case of MIMO (multiple input, multiple output) SC-FDMA, ML detection can be applied to either all (or some) of the layers at a time instant or all (or some) of the time instants at a layer. In order to whiten the correlated noise-plus-interference at the input of the ML detection step, a whitening filter is inserted between the steps of equalization and ML detection. The filter coefficients can be calculated based on the channel coefficients (including precoder, if any) and noise covariance. The Cholesky decomposition can be utilized to calculate the coefficients. The invention theoretically minimizes the error probability when the output of equalization is partially available.

Figure 7:
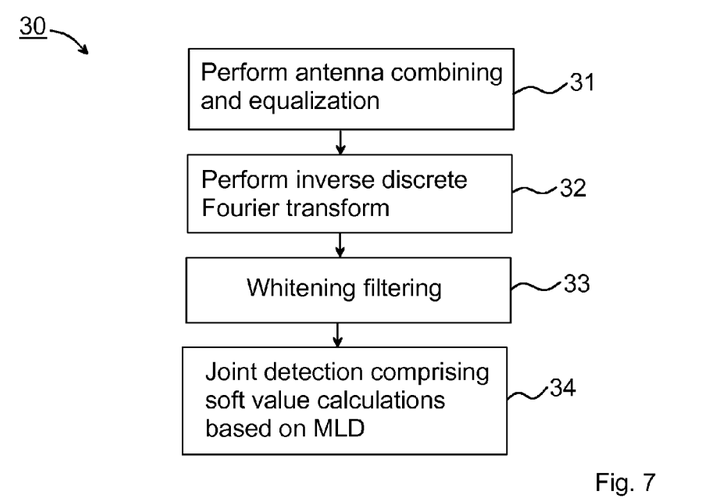
FIG. 7 illustrates a flowchart over steps of a method in accordance with the present invention.

With reference to FIG. 7, showing a flow chart over steps in a method 30 in accordance with the invention, the above-described steps performed in the decoder can be summarized as follows:

The communication signals are modulated, pre-coded by a discrete Fourier transform and transmitted by means of single-carrier frequency division multiple access scheme (SC-FDMA).

The method 30 comprises a first step 31 of performing an antenna combining and equalization on a signal Y(m)

observed at the receiver based on a weighting matrix W(m). Thereby a model of observed signal $\hat{X}(m)$ and a frequency domain channel estimate $\hat{H}(m)$ are provided. The method 30 comprises a second step 32 of performing inverse discrete Fourier transform on the model of observed signal $\hat{X}(m)$, thereby providing a time domain model $\tilde{S}(n)$ of the observed signal $\hat{X}(m)$, and performing an inverse discrete Fourier transform of the frequency domain channel estimate $\hat{H}(m)$, thereby providing a time domain channel estimate $\tilde{G}(p)$ with length P wherein p=0, 1, . . . , P−1. The method 20 comprises the third step 33 of whitening filtering the time domain model $\tilde{S}(n)$ of the observed signal $\hat{X}(m)$, thereby providing a whitened time domain model $\hat{S}(n)$ of the time domain model $\tilde{S}(n)$ and a whitened time domain channel estimate $\hat{G}(p)$ for p=0, 1, . . . , P−1. The method 30 comprises a fourth step 34 of jointly detecting the received at least two communication signals by performing soft value calculations based on maximum likelihood detection of the whitened time domain model $\hat{S}(n)$, using the whitened time domain channel estimate $\hat{G}(p)$ for p=0, 1, . . . , P−1, whereby the received communication signals are decoded.

In accordance with an embodiment of the invention, the step of whitening 33 is performed before the step of joint detection.

In accordance with another embodiment of the invention, the step of jointly detecting 34 comprises a single tap channel model, P=1. The inventive method is thus applicable to both single-tap channel models as well as multi-tap channel models.

In accordance with yet another embodiment of the invention, the method 30 comprises, prior to the step of jointly detecting 33, a step (not illustrated in FIG. 7) of performing QR factorization of the time domain channel matrix estimate $\hat{G}$, providing a QR factorized signal model $\hat{S}_{QR}(n)$ and a time domain channel matrix estimate after QR factorization $\hat{G}_{QR}$. The step of jointly detecting then comprises detecting the QR factorized signal model $\hat{S}_{QR}(n)$ by: calculating soft values for bit number i and user k providing two sets of all possible transmitted symbols $S_{1,k,i}$, $S_{0,k,i}$, for which transmitted bit is "1" and "0", respectively; selecting which of the two sets of all possible transmitted symbols $S_{1,k,i}$, $S_{0,k,i}$ to evaluate; and evaluating the selected possible transmitted symbols. By performing a QR-factorization, the amount of calculations is reduced even further, since the channel matrix $\hat{G}_{QR}$ is upper triangular. Thereby the use of M-algorithm is enabled.

In accordance with still another embodiment of the invention, using the M-algorithm, the step of evaluating comprises the steps of: defining maximum likelihood detection residuals as $E(n)=\hat{S}_{QR}(n)-\hat{G}_{QR}S(n)$, where $E(n)=[e_0(n) \ldots e_{K-2}(n) e_{K-1}(n)]^T$, $\hat{S}_{QR}(n)=[\hat{s}_{QR,0}(n) \ldots \hat{s}_{QR,K-1} \hat{s}_{QR,K-1}(n)]^T$ and $S(n)=[s_0(n) \ldots s_{K-2}(n) s_{K-1}(n)]^T$, whereby the residual $e_{K-1}(n)$ only depends on observation symbol $\hat{s}_{QR,K-1}(n)$ and symbol hypothesis $s_{K-1}(n)$,
 (i) calculating, for the last row of the definition, metric values equal to the absolute square of maximum likelihood detection residuals for all possible candidates of $s_{K-1}(n)$,
 (ii) determining M candidates of $s_{K-1}(n)$, providing M surviving candidates,
 (iii) repeating steps (i) and (ii) for one additional value of the observation signal $\hat{s}_{QR,K-2}(n)$,
 (iv) calculating, for the M surviving candidates, all possible transmitted candidates of $s_{K-2}(n)$, and
 (v) repeating steps (iii) and (iv) for all observation signals. The use of the M-algorithm greatly reduces the amount of calculations required for determining, with high probability which codeword that was most likely to have been sent. The number of iterations can be held to a minimum.

In accordance with yet another embodiment of the invention, the step of jointly detecting 34 comprises soft value calculations performed by means of Log Likelihood Ratio with squared Euclidian distances or Log Likelihood Ratio based on Euclidian distances.

In accordance with yet another embodiment of the invention, the step of whitening filtering 33 comprises: estimating a residual noise-plus-interference covariance matrix $R_{n_k}$; performing Cholesky decomposition of the residual noise-plus-interference covariance matrix $R_{n_k}=LL^*$ thereby providing an lower triangular matrix L; whitening the signal time domain model $\tilde{S}(n)$ by multiplying the signal time domain model $\tilde{S}(n)$ with L*, thereby providing a whitened time domain model $\hat{S}(n)$; and whitening the time domain channel matrix estimate $\tilde{G}$ by multiplying the time domain channel estimate $\tilde{G}$ with L*, thereby providing a whitened time domain channel estimate $\hat{G}$.

In accordance with still another embodiment of the invention, the step of whitening 33 comprises scaling the received signal. This embodiment reduces the number of calculations required even further, but at the expense of loosing some performance in terms of accuracy.

In accordance with yet another embodiment of the invention, the step of scaling (special case of step 33) comprises estimating a residual noise covariance matrix $\tilde{L}$ by a sum of $\Lambda_N$ and $\Lambda_{ISI}$, wherein $\Lambda_N$ is the noise covariance matrix of the white noise matrix $N_{\tilde{S}}(n)$ and $\Lambda_{ISI}$ is inter-symbol interference covariance matrix, and scaling the signal time domain model $\tilde{S}(n)$ by multiplying the signal time domain model $\tilde{S}(n)$ with $(\text{Diag}\{\tilde{L}\})^{-1/2}$, providing a scaled time domain model $\hat{S}(n)$, and scaling the time domain channel matrix estimate $\tilde{G}$ by multiplying the time domain channel estimate $\tilde{G}$ with $(\text{Diag}\{\tilde{L}\})^{-1/2}$, providing a scaled time domain channel estimate $\hat{G}$.

The antenna combining may be performed by a linear minimum mean square error, and/or the weighting matrix W(m) may be chosen so as to minimize a mean square error.

An important aspect of embodiments of the invention is the location of the function blocks. By separating the whitening function block from the joint detection function block, a reduction in computational efforts is enabled. It is to be noted that the whitening can be performed prior to or after the QR decomposition and prior to or after the IDFT.

It is further noted that the above-described transmitter and receiver functions can be implemented in hardware, software or some combination thereof, e.g. implemented by Application Specific Integrated Circuits (ASICs) or by a computer program comprising stored program instructions to be executed for example by a microprocessor or a digital signal processor.

Figure 8:
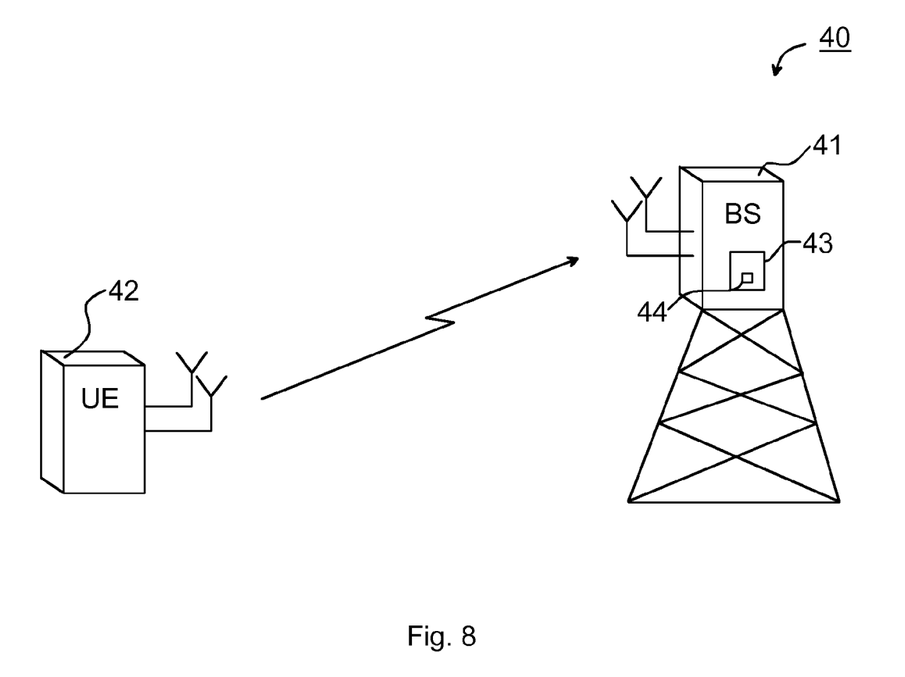
FIG. 8 illustrates a base station and user equipment of a wireless communication network wherein the present invention may be applied.

FIG. 8 illustrates a wireless radio communication system 40 comprising a base station 41 and user equipment 42, wherein the present invention may be applied. The base station 41 comprises a receiver 43 for use in the wireless communication system 30 for communication of signals. The receiver 43 in turn comprises means 44 for performing the method 20 described. In particular, the means 44 are intended to comprise all the necessary means described above, i.e. boxes 12-24.

The means 34 may for example comprise Application Specific Integrated Circuits (ASICs) or a computer program comprising stored program instructions to be executed by a microprocessor or a digital signal processor.

In summary, the invention enables a reduced complexity ML detection for SC-FDMA. Firstly, the invention theoretically minimizes the error probability, when the output of equalization is partially available, i.e. it is divided into several smaller parts and each part is taken as the input of the detector. Secondly, since ML detection is applied to a part of a SC-FDMA symbol, instead of the entire SC-FDMA symbol, it is possible to significantly reduce the resulting computational complexity, depending on the definition of the input of ML detection. For example, if ML detection is carried out for each vector symbol from the linear equalization step, the number of hypotheses amounts to 16 ($4^2$), assuming the transmission of 2 layers modulated by QPSK. In addition, the whitening step leads to additional computational complexity, as compared to OFDM, but it amounts to only a small faction of the total complexity. Furthermore, thanks to the single-carrier property of SC-FDMA, the calculation should be done only once per SC-FDMA symbol. Thirdly, since the whitening filtering removes the correlation of noise-plus-interference, most of the state-of-the-art ML detection schemes are applicable. Fourthly, the invention provides flexibility regarding performance versus complexity trade-offs in accordance with the definition of the input to the ML detection. For example, if ML detection is performed jointly for two consecutive vector symbols, the number of hypotheses increases to 256 (=$4^4$) in the above example. Since ML detection is applied to two consecutive symbols instead of one symbol from the output of the linear equalization, in this example, the resulting performance is expected to improve, compared to per-vector-symbol ML detection. By including more and more consecutive symbols, the performance is expected to continue to improve, but at an increasing computational cost. It is noted that, as mentioned earlier, the present invention is quite generally applicable to any part of the output of the linear equalization. For example, the first and second elements of two consecutive vector symbols, i.e. the two first layers of two consecutive samples, can be taken as the input to the ML detection, where the number of hypotheses amount to 256 (=$4^4$).

Finally, some advantages of the invention are summarized in the following:

The error probability is optimized, when the output of equalization is partially available, The computational complexity is reasonable, Thanks to whitening filtering, most of the state-of-the-art ML detection schemes are applicable, A flexible trade-off between error performance and computational complexity is rendered possible.

The invention claimed is:

1. A method in a receiver for decoding at least two received communication signals, said communication signals being modulated, pre-coded by a discrete Fourier transform and transmitted by a single-carrier frequency division multiple access scheme (SC-FDMA), said method comprising the steps of:

performing antenna combining and equalization on a signal Y(m) observed at said receiver based on a weighting matrix W(m) to provide a model of observed signal $\hat{X}(m)$ and a frequency domain channel estimate $\hat{H}(m)$;

performing inverse discrete Fourier transform on said model of observed signal $\hat{X}(m)$ to provide a time domain model $\tilde{S}(n)$ of said observed signal $\hat{X}(m)$;

performing an inverse discrete Fourier transform of said frequency domain channel estimate $\hat{H}(m)$ to provide a time domain channel estimate $\hat{G}(p)$ with length P wherein p=0, 1, . . . , P−1;

whitening said time domain model $\tilde{S}(n)$ of said observed signal $\hat{X}(m)$ to provide a whitened time domain model $\hat{S}(n)$ of said time domain model $\tilde{S}(n)$ and a whitened time domain channel estimate $\hat{G}(p)$ for p=0, 1, . . . , P−1, wherein the whitening of said time domain model is performed after performing the antenna combining and equalization step and after performing the inverse discrete Fourier transform on the model of the observed signal; and jointly detecting said received at least two communication signals by performing soft value calculations based on maximum likelihood detection (MLD) of said whitened time domain model $\hat{S}(n)$ and by using said whitened time domain channel estimate $\hat{G}(p)$ for p=0, 1, . . . , P−1, wherein the joint detection decodes said at least two received communication signals.

2. The method as claimed in claim 1, wherein said step of whitening is performed prior to said step of jointly detecting.

3. The method as claimed in claim 1, wherein said step of jointly detecting comprises a single tap channel model, P=1.

4. The method as claimed in claim 1, comprising, prior to said step of jointly detecting, a step of performing QR factorization of said time domain channel estimate $\hat{G}$ to provide a QR factorized signal model $\hat{S}_{QR}(n)$ and a time domain channel matrix estimate after QR factorization $\hat{G}_{QR}$, and wherein said step of jointly detecting comprises detecting said QR factorized signal model $\hat{S}_{QR}(n)$ by:

calculating soft values for bit number i and user k providing two sets of all possible transmitted symbols $S_{1,k,i}$, $S_{0,k,i}$, for which transmitted bit is "1" and "0", respectively, selecting which of said sets of all possible transmitted symbols $S_{1,k,i}$, $S_{0,k,i}$ to evaluate, and evaluating said selected possible transmitted symbols.

5. The method as claimed in claim 4, wherein said step of evaluating comprises the steps of:

defining maximum likelihood detection residuals as $E(n)=\hat{S}_{QR}(n)-\hat{G}_{QR}S(n)$, where $E(n)=[e_0(n) \ldots e_{K-2}(n)\ e_{K-1}(n)]^T$, $\hat{S}_{QR}(n)=[\hat{s}_{QR,0}(n) \ldots \hat{s}_{QR,K-2}\ \hat{s}_{QR,K-1}(n)]^T$ and $S(n)=[s_0(n) \ldots s_{K-2}(n)\ s_{K-1}(n)]^T$, wherein the residual $e_{K-1}(n)$ only depends on observation symbol $\hat{s}_{QR,K-1}(n)$ and symbol hypothesis $s_{K-1}(n)$, (i) calculating, for the last row of said definition, metric values equal to the absolute square of maximum likelihood detection residuals for all possible candidates of $s_{K-1}(n)$, (ii) determining M candidates of $s_{K-1}(n)$ to provide M surviving candidates, (iii) repeating steps (i) and (ii) for one additional value of said observation signal $\hat{s}_{QR,K-2}(n)$, (iv) calculating, for said M surviving candidates, all possible transmitted candidates of $s_{K-2}(n)$, and (v) repeating steps (iii) and (iv) for all observation signals.

6. The method as claimed in claim 1, wherein said step of jointly detecting comprises soft value calculations performed by a Log Likelihood Ratio with squared Euclidian distances or Log Likelihood Ratio based on Euclidian distances.

7. The method as claimed in claim 1, wherein said step of whitening comprises:

estimating a residual noise-plus-interference covariance matrix $R_{\eta_k}$, performing Cholesky decomposition of said residual noise-plus-interference covariance matrix $R_{\eta_k}=LL^*$ to provide a lower triangular matrix L, whitening said signal time domain model $\tilde{S}(n)$ by multiplying said signal time domain model $\tilde{S}(n)$ with $L^*$ to provide the whitened time domain model $\hat{S}(n)$, and whitening said time domain channel matrix estimate $\tilde{G}$ by multiplying said time domain channel estimate $\hat{G}$ with $L^*$ to provide the whitened time domain channel estimate $\tilde{G}$.

8. The method as claimed in claim 1, wherein said step of whitening comprises scaling said received signal with $(\text{Diag}\{R_{n_k}\})^{-1/2}$.

9. The method as claimed in claim 8, wherein said step of scaling comprises:
   estimating a residual noise covariance matrix $\tilde{L}$ by a sum of $\Lambda_N$ and $\Lambda_{ISI}$, wherein $\Lambda_N$ is the noise covariance matrix of said white noise matrix $N_{\hat{S}}$ and $\Lambda_{ISI}$ is inter-symbol interference covariance matrix, and
   scaling said signal time domain model $\tilde{S}(n)$ by multiplying said signal time domain model $\tilde{S}(n)$ with $(\text{Diag}\{\tilde{L}\})^{-1/2}$ to provide the scaled time domain model $\hat{S}(n)$, and
   scaling said time domain channel matrix estimate $\tilde{G}$ by multiplying said time domain channel matrix estimate $\tilde{G}$ with $(\text{Diag}\{\tilde{L}\})^{-1/2}$ to provide the scaled time domain channel estimate $\hat{G}$.

10. The method as claimed in claim 1, wherein said weighting matrix $W(m)$ is chosen so as to minimize a mean square error.

11. A receiver for use in a radio communication system for communication of signals, comprising a microprocessor, digital signal processor, or Application Specific Integrated Circuit (ASIC) configured to:
   perform an antenna combining and equalization on a signal $Y(m)$ observed at said receiver based on a weighting matrix $W(m)$ to provide a model of observed signal $\hat{X}(m)$ and a frequency domain channel estimate $\tilde{H}(m)$;
   perform inverse discrete Fourier transform on said model of observed signal $\hat{X}(m)$ to provide a time domain model $\tilde{S}(n)$ of said observed signal $\hat{X}(m)$;
   perform an inverse discrete Fourier transform of said frequency domain channel estimate $\tilde{H}(m)$ to provide a time domain channel estimate $\tilde{G}(p)$ with length P wherein p=0, 1, . . . , P−1;
   perform, after the antenna combining and equalization is performed and after the inverse discrete Fourier transform on the model of the observed signal is performed, whitening of said time domain model $\tilde{S}(n)$ of said observed signal $\hat{X}(m)$ to provide a whitened time domain model $\hat{S}(n)$ of said time domain model $\tilde{S}(n)$ and a whitened time domain channel estimate $\hat{G}(p)$ for p=0, 1, . . . , P−1, and
   jointly detect said received at least two communication signals by performing soft value calculations based on maximum likelihood detection (MLD) of said whitened time domain model $\hat{S}(n)$ and by using said whitened time domain channel estimate $\hat{G}(p)$ for p=0, 1, . . . , P−1, wherein the receiver is configured to perform the joint detection to decode said at least two received communication signals.

12. The method as claimed in claim 1, wherein the step of performing the antenna combining and equalization comprises performing linear minimum mean square error (MMSE) equalization.

13. The method as claimed in claim 11, wherein the microprocessor, digital signal processor, or ASIC is configured to perform the antenna combining and equalization by performing linear minimum mean square error (MMSE) equalization.

* * * * *